United States Patent [19]

Walsh

[11] Patent Number: 5,696,824

[45] Date of Patent: Dec. 9, 1997

[54] SYSTEM FOR DETECTING UNAUTHORIZED ACCOUNT ACCESS

[75] Inventor: Joe Walsh, Lynnwood, Wash.

[73] Assignee: E-Comm Incorporated, Lynnwood, Wash.

[21] Appl. No.: 480,614

[22] Filed: Jun. 7, 1995

[51] Int. Cl.⁶ .............................. H04L 9/32; H04L 9/00

[52] U.S. Cl. ................... 380/24; 380/4; 380/23; 380/25; 380/49

[58] Field of Search .................. 380/4, 9, 23, 24, 380/25, 49, 50

[56] References Cited

U.S. PATENT DOCUMENTS

| | | | |
|---|---|---|---|
| 4,731,575 | 3/1988 | Sloan | 380/23 X |
| 5,056,141 | 10/1991 | Dyke | 380/25 |
| 5,363,449 | 11/1994 | Bestock | 380/23 |

*Primary Examiner*—Bernarr E. Gregory
*Attorney, Agent, or Firm*—Weiss, Jensen, Ellis & Howard

[57] ABSTRACT

A method and system for detecting unauthorized account access. The system may operate in conjunction with known methods of remote access authentication. The system provides a unique account for each authorized person (i.e., each user) and a system sequence number and a user sequence number for each account. For each access to the account, the system updates the system sequence number corresponding to that account to the next number in a preselected sequence, and the user updates the user sequence number in like manner. The preselected sequence comprises a sequence of pseudorandom numbers and the update comprises selecting the next pseudorandom number using a pseudorandom number generator, but the sequence number may be updated using other techniques, so long as the system and the user are both capable of performing the same updates. The system and the user perform a handshake process, to assure that the system updates the system sequence number, and the user updates the user sequence number, in synchrony. Normally, the system sequence number and the user sequence number will be the same, but when there is an authorized access by third party the system will update the system sequence number and the user will not update the user sequence number, causing the two sequence numbers to be unequal. When the two sequence numbers are unequal, when the user next accesses the account, the user is made aware that an unauthorized access has occurred.

14 Claims, 7 Drawing Sheets

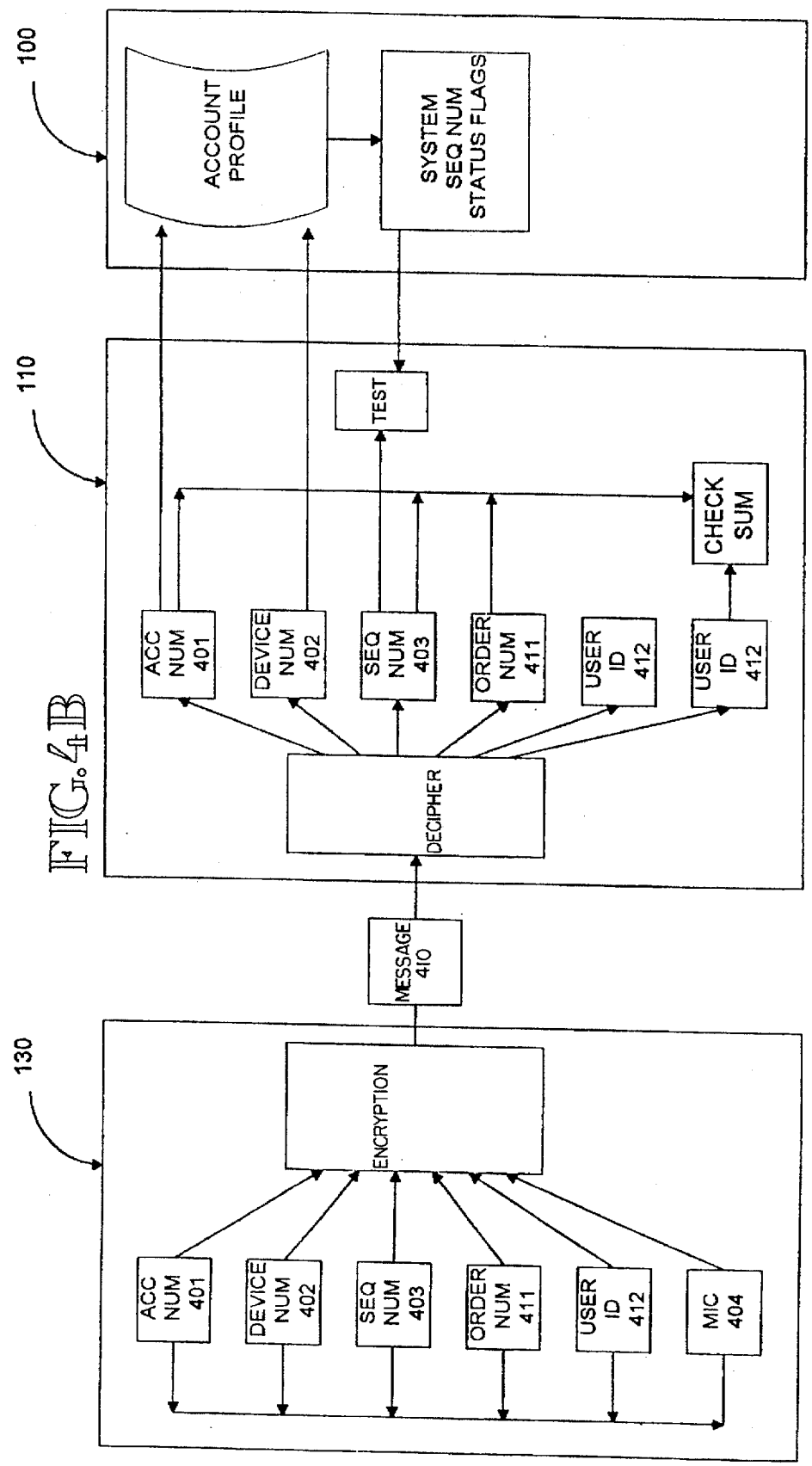

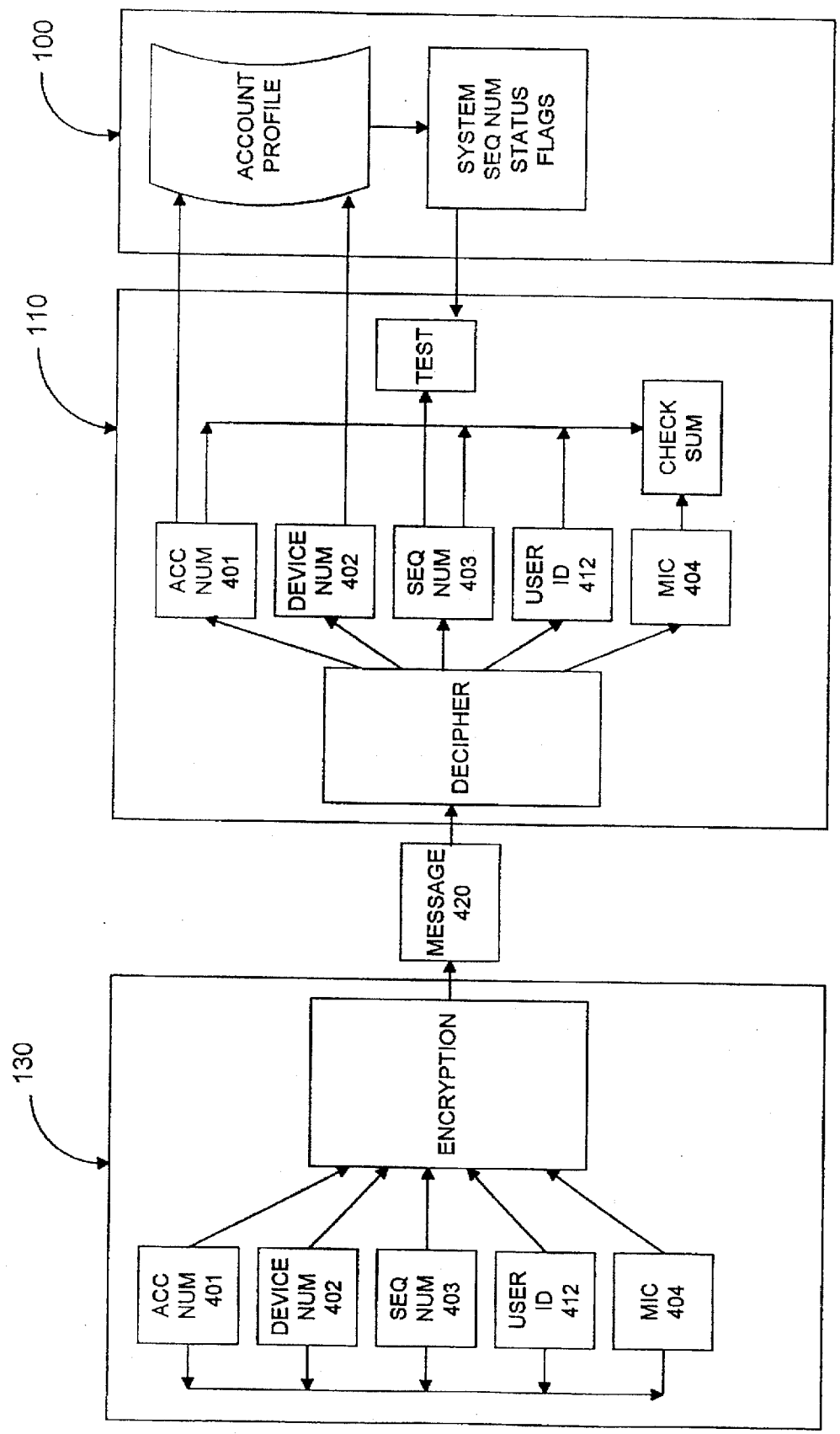

SYSTEM FOR DETECTING UNAUTHORIZED ACCOUNT ACCESS

BACKGROUND OF THE INVENTION

1. Field of the Invention

This invention relates to a method and system for detecting unauthorized account access.

2. Description of Related Art

Advances in communications and in computing have caused businesses and other organizations to offer remote access, i.e., access by means of a communication medium such as a telephone network, to a variety of goods and services. Because remote access does not involve face-to-face contact, it is generally necessary to authenticate the person seeking access. Such authentication may comprise having the person seeking access providing some authentication information (such as an account number or a credit card or debit card number). Because information such as account numbers is often easy for unauthorized persons to obtain, the person seeking access must typically also supply some hidden authorization information, such as a password.

One problem which has arisen in the art of remote access is that it is sometimes possible for unauthorized persons to obtain the hidden authorization information. First, unauthorized persons may simply guess the hidden authorization information; this can occur when the hidden authorization information is relatively short, such as a password or a bank-access card "PIN" (personal identification number). Second, unauthorized persons may monitor electronic communications by the authorized person for the hidden authorization information; this can occur for cellular telephones and similar devices. When unauthorized persons construct a duplicate cellular telephones with a copy of the hidden authorization information, this is called "cloning" and the duplicate cellular telephone is called a "clone". Third, unauthorized persons may simply bribe employees of the service provider, or other persons having access to the hidden authorization information.

Known methods of access control have been reasonably successful at preventing access by unauthorized persons, but are generally unable to prevent access by unauthorized persons who have obtained the hidden authorization information. Because it is possible for unauthorized persons to obtain the hidden authorization information, known methods of access control have the drawback that the authorized person may not be aware that unauthorized persons have obtained access.

Some examples of known methods of access control in telephone communication systems are as follows:

U.S. Pat. No. 4,860,341, "Radiotelephone Credit Card Call Approval Synchronization", issued Aug. 22, 1989, shows a system in which a credit card is used to place cellular telephone calls, using a cellular telephone with a credit card reader. In this system, authentication requires a separate call to a verification and billing computer system to authenticate the credit card before the user is allowed to access the cellular telephone network.

U.S. Pat. No. 5,249,230, "Authentication System", issued Sep. 28, 1993, in the name of Thomas J. Mihm, Jr., and assigned to Motorola, Inc., shows a system which receives an equipment ID for each user terminal and uses a secret key to encrypt the equipment ID with a user ID and an error detection code, to form an encrypted block. The encrypted block is programmed into a physical authentication module which is physically distributed and installed at the user terminal, about once per month.

U.S. Pat. No. 5,343,519, "Autodialer with PIN Feature", issued Aug. 30, 1994, in the name of Peter Feldman, shows an autodialing device which records credit card numbers, personal identification numbers, and telephone numbers in a memory, and which may be used to transmit those numbers on telephone connections and to automated teller machines. The device sends these numbers much faster than a person could key them in, and does not require that the person must key them in while being watched, which provides a measure of security against unauthorized persons who might be listening or watching.

U.S. Pat. No. 5,361,062, "Personal Security System", issued Nov. 1, 1994, in the name of Kenneth P. Weiss et al. and assigned to Security Dynamics Technologies, Inc., shows a method and system for verifying the identity of a user, in which each user is given a token which displays a pseudorandom sequence of values, in response to a seed and an internal clock. The system may frequently demand the current pseudorandom value from the user, who simply types it in, thus verifying possession of the token.

While each of these known methods of access control achieves the purpose of preventing access by unauthorized persons, they are generally subject to two drawbacks: (1) Unauthorized persons who have obtained the hidden authorization information (or duplicated any physical circuits needed for access) may still obtain access. (2) In the circumstance that access is compromised, the authorized person is not necessarily made aware of that compromise.

In circumstances where remote access is for goods or services which require payment, either the authorized person (the customer) or the service provider ends up paying for the goods or services consumed by unauthorized persons who obtained unauthorized access. This may be discovered when the service provider bills the customer for the unauthorized goods or services. Accordingly, it would be desirable to determine as soon as possible after any unauthorized access occurs, in particular, before any further unauthorized distribution of access information.

Another problem which has arisen in the art is that since the authorized person generally is not informed of the unauthorized access (until receiving a cellular telephone bill), the information to create the cloned device is valuable to unauthorized persons, but only for a relatively short time. Accordingly, this cloning information may be further distributed by the creator of the clone, and redistributed by others receiving the cloning information. The cloning information may thus be quite widely distributed, sometimes resulting in hundreds or thousands of clones.

Accordingly, it would be desireable to provide a method and system for automatically preventing unauthorized account access by numerous unauthorized devices.

Known methods of communication exist for determining if messages, or portions of messages, have been lost or damaged. For example, the Kerberos V5 system, as described in Kaufman, *Network Security: PRIVATE Communication in a PUBLIC World*, optionally inserts a sequence number in message packets so that messages which are lost or out-of-order may be detected. While this method achieves the purpose of detecting lost or out-of-order messages, it is still subject to the drawbacks noted for known methods of authentication. In particular, although credentials messages are identified with sequence numbers, there is no mechanism for detecting and reporting successful access by unauthorized persons.

Accordingly, it would be desirable to provide a method and system for automatically detecting unauthorized account access and automatically preventing unauthorized account access by duplicate account access devices.

SUMMARY OF THE INVENTION

The invention provides a method and system for detecting unauthorized account access. In a preferred embodiment, the system may operate in conjunction with known methods of remote access authentication. The system provides a unique account for each authorized person (i.e., each user) and a system sequence number and a user sequence number for each account. For each access to the account, the system updates the system sequence number corresponding to that account to the next number in a preselected sequence, and the user updates the user sequence number in like manner. Preferably, the preselected sequence comprises a sequence of pseudorandom numbers and the update comprises selecting the next pseudorandom number using a pseudorandom number generator, but in alternative embodiments the sequence number may be updated using other techniques, so long as the system and the user are both capable of performing the same updates.

In a preferred embodiment, the system and the user perform a handshake process, to assure that the system updates the system sequence number, and the user updates the user sequence number, in synchrony. Normally, the system sequence number and the user sequence number will be the same, but when there is an unauthorized access by third party the system will update the system sequence number and the user will not update the user sequence number, causing the two sequence numbers to be unequal. When the two sequence numbers are unequal, when the user next accesses the account, the user is made aware that an unauthorized access has occurred.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose computers operating under program control, and that modification of such general purpose computers to implement the process steps and data structures described herein would not require undue invention.

The present invention may be used in conjunction with inventions disclosed in the following co-pending applications.

Application Ser. No. 08/482,261, filed Jun. 7, 1995, in the name of the same inventor as the present application, titled "Bar Code Wand and Sound Communication System"; and Application Ser. No. 08/485,261, filed Jun. 7, 1995, in the name of the same inventor as the present application, titled "Low Power Bar Code Wand", now U.S. Pat. No. 5,607,616.

These applications are each hereby incorporated by reference as if fully set forth herein, and are referred to collectively herein as the "incorporated disclosures".

REMOTE ACCESS TO A SERVICE PROVIDER

Figure 1:
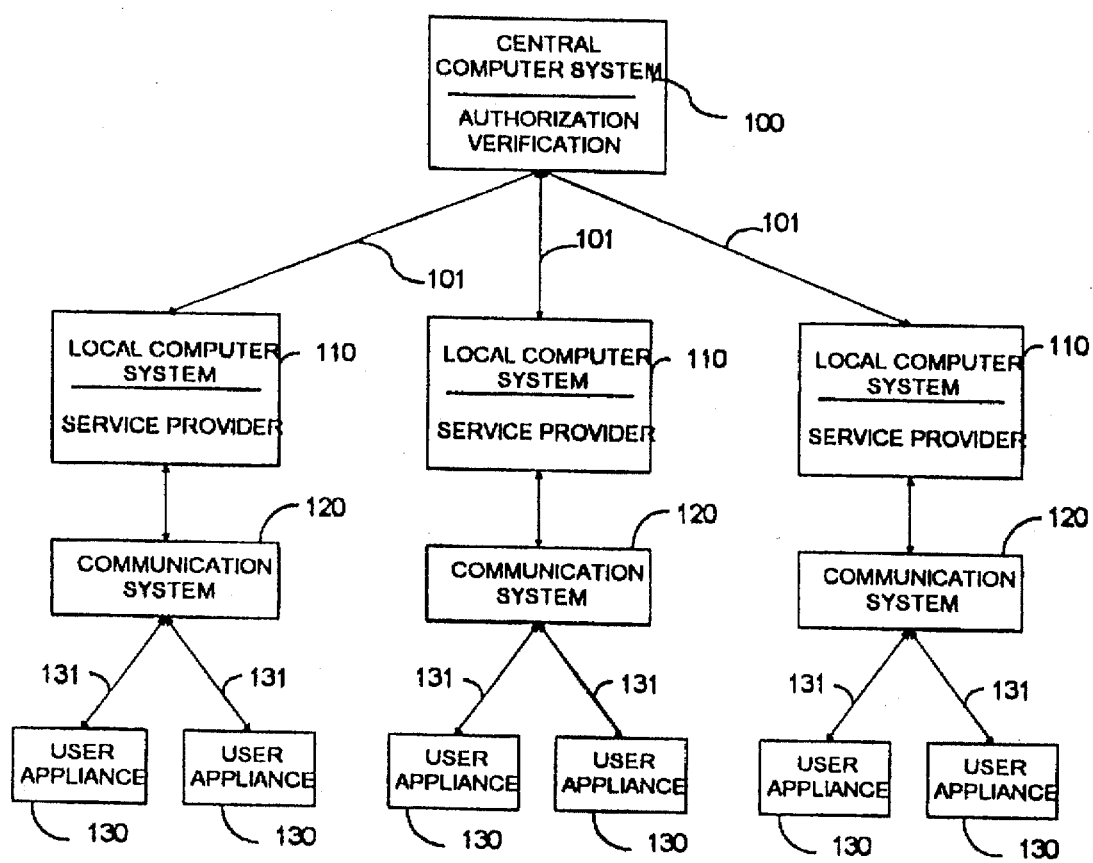
FIG. 1 shows a system for remote access to a service provider by a user.

FIG. 1 shows a system for remote access to a service provider by a user.

In a preferred embodiment, a system for remote access to a service provider by a user may be used in conjunction with inventions shown in the incorporated disclosures. The system comprises a central computer system 100 for storing authorization and verification information about users. The central computer system 100 is coupled using a communication path 101 to a local computer system 110, for performing authorization and verification of users.

Preferably, there is more than one local computer system 110 and each is coupled to the central computer system 100 by a corresponding communication path 101. However, in alternative embodiments, there may be only a single local computer system 110 or a plurality of local computer systems 110 may multiplex or otherwise share a single communication path 101. Moreover, there is no special requirement that the central computer system 100 must be physically remote from the local computer systems 110, or that it must be physically located in some "central" place. Similarly, there is no special requirement that the local computer systems 110 must be physically "local" to anything in particular.

In a preferred embodiment, the communication path 101 comprises a telephone connection using a telephone network. However, those skilled in the art would recognize, after perusal of this application, that the communication path 101 may comprise any means for communication, including a cellular telephone connection, a radio telephone connection, a local or wide-area computer network connection, or some other communication medium.

The local computer system 110, for providing services to users, is coupled using a communication system 120 to a user device 130, for communicating user commands to the local computes system 110 and information from the local computer system 110 to the user. Preferably, there is more than one user device 130 (and there is preferably more than one user) and each is coupled to the communication system 120. However, in alternative embodiments, there may be only a single user device 130, or the local computer system 110 may use a plurality of communication systems 120 for coupling to user devices 130.

The local processor comprises a microprocessor having memory for programs and data, and comprising a protected memory for storing information which it is desired should not be compromised even if, the user device were lost or stolen. The protected memory comprises a memory that will self-erase if it is forcibly opened, so that it cannot be read other than in the ordinary course of using the user device. Such protected memories are known in the art of semiconductor manufacture. In a preferred embodiment, for example, information private to the user, such as account numbers, account passwords, and credit card numbers, is encrypted for transmission stored in an encrypted form in ordinary data memory, with parameters for decrypting that information recorded in the protected memory.

In a preferred embodiment, the communication system 120 is a telephone network, to which the user devices 130 make individual telephone connections 131. The individual telephone connections 131 may comprise land-line telephone connections, cellular telephone connections, or other telephone connections. However, those skilled in the art will recognize, after perusal of this application, that the communication system 120 may comprise any means for communication, including a cellular telephone network, a radio telephone network, a local or wide-area computer network, a communication satellite, or some other communication medium.

As described in further detail with regard to FIG. 3, each user uses a user device 130 to communicate with the local computer system 110 for providing services, and each user device 130 uses a communication system 120 to communicate with the local computer system 110. The local computer system 110 communicates using the communication path 101 with the central computer system 100 for authenticating users.

CREDIT CARD OR DEBIT CARD VERIFICATION AND AUTHORIZATION

Figure 2:
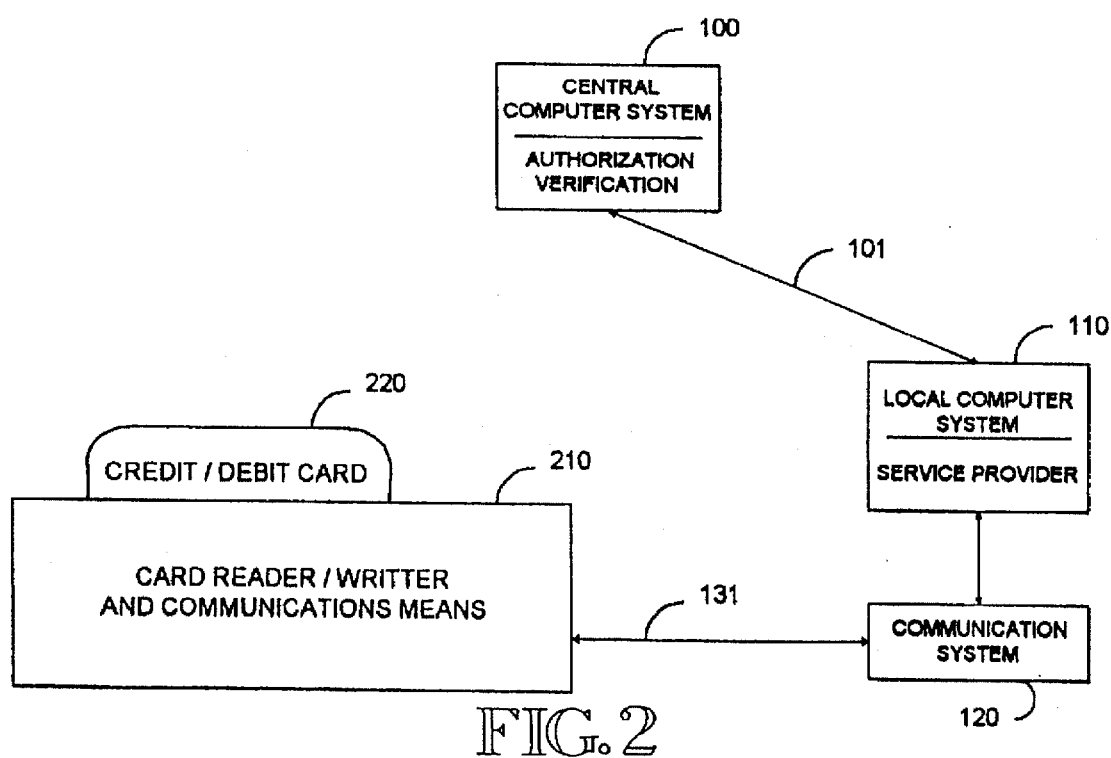
FIG. 2 shows a system for credit card or debit card verification and authorization.

FIG. 2 shows a system for credit card or debit card verification and authorization.

A system 200 for credit card or debit card verification and authorization comprises a central computer system 100 for authorization and verification of accounts, a local computer system 110 for providing services, a communication path 101 coupling the central computer system 100 and the local computer system 110, and a communication system 120, like that described with regard to FIG. 1.

The system 200 further comprises a card reader 210 into which a card 220 can be placed. Preferably, the card 220 is a credit card or a debit card, but in alternative embodiments the card 220 may be an authorization card, an identification card, or another card for the purpose of authentication of the authorized person, such as a customer.

The card reader 210 is coupled to the communication system 220 using a telephone connection 131 like that described with regard to FIG. 1. Thereafter, as described in further detail with regard to FIG. 3, the card reader 210 uses the communication system 120 to communicate with the local computer system 110 for providing services. The local computer system 110 communicates using the communication path 101 with the central computer system 100 for authenticating users.

As the technique shown with regard to FIG. 3 involves recording a sequence number by the user (or the user device 130), the card reader 210 is preferably also capable of writing data to the card 220, and the card is preferably also capable of receiving and storing such data.

In a simple alternative embodiment, the credit card reader 210 may present the sequence number to the user (or the user device 130) for verification, using either audio or visual means. In this alternative embodiment, the sequence number is preferably a simple counting function, so that the user can easily determine if any third party has used the account.

In a preferred embodiment where the card reader 210 is located a point-of-sale terminal or a sales location, the card read may skip the step of coupling to any local computer system 110 and use the communication path 101 to couple directly to the central computer system 100 for authorization and verification of the card 220.

METHOD FOR DETECTING UNAUTHORIZED ACCESS BY CLONED DEVICES

Figure 3A:
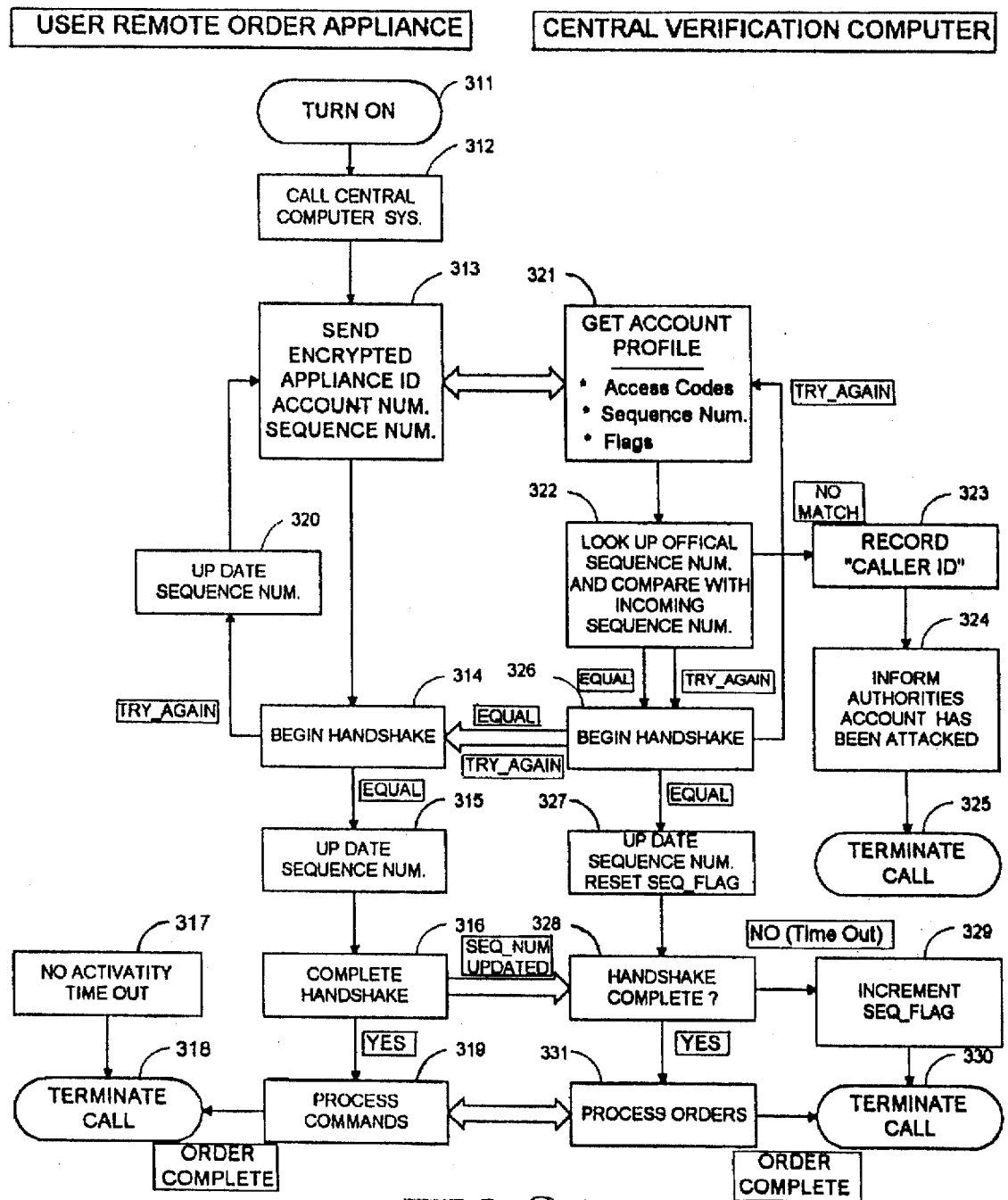
FIG. 3, comprising FIG. 3A and FIG. 3B collectively, shows a process flow diagram of a method for detecting unauthorized access by cloned devices.
Figure 3B:
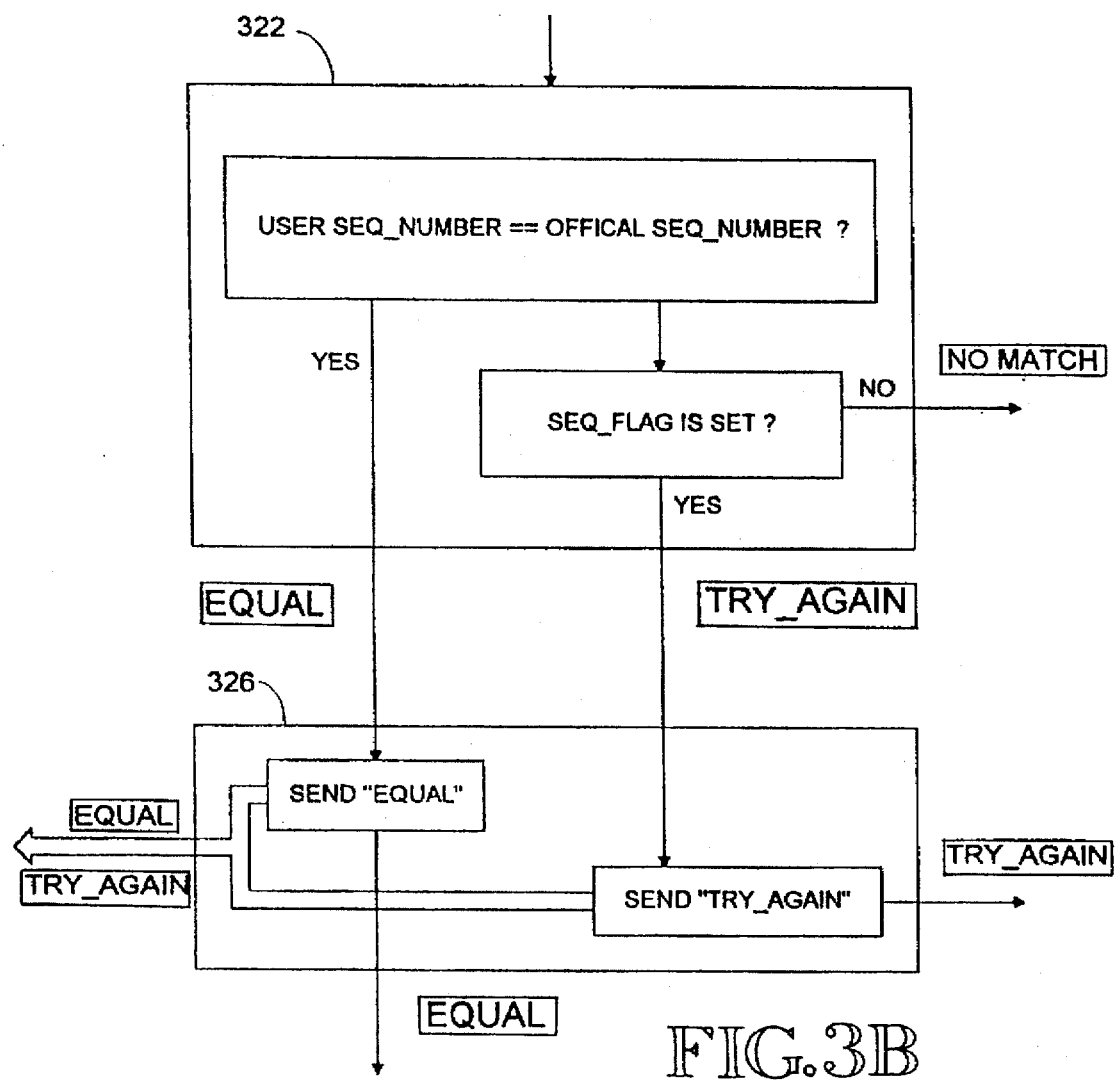

FIG. 3, comprising FIG. 3A and FIG. 3B collectively, shows a process flow diagram of a method for detecting unauthorized access by cloned devices.

A method 300 for detecting unauthorized access by cloned devices comprises a handshake protocol with a set of user steps 311 through 320 to be performed by the user and a set of system steps 321 through 330 to be performed by the system (the central computer system 100 and the local computer system 110). The user steps 311 through 320 are generally performed by the user device 130 shown in FIG. 1 or the card reader 210 shown in FIG. 2, while the system steps 321 through 330 are generally performed by the central computer system 100 and the local computer system 110 shown in FIG. 1 and FIG. 2.

At a step 311, the user activates the user device 130. A preferred user device comprises a microprocessor and a communication element coupled to the telephone line interface. The microprocessor comprises a processor, program and data memory (including nonvolatile protected memory), a serial communication interface, a timer, input/output, and a signal interface for an interrupt signal. These components of microprocessors are known in the art of computing. The communication element comprises a modem, a DTMF tone generator, a CPTD element and a serial interface for coupling to the microprocessor. In a preferred embodiment, the user device 130 initiates the method 300 each time it is powered up or it accesses the local computer system 110, and may further initiate the method 300 after selected intervals of time, e.g., once every eight hours while it remains powered up. However, those skilled in the art will recognize, after perusal of this application, that there are no specific times when the method 300 must be initiated, and that selection of various times for initiation of the method are within the scope and spirit of the invention.

At a step 312, the user device 130 contacts the central computer system 100 using the local communication system 120. This step 312 is performed by coupling a telephone handset to the telephone connection 131 and dialing a telephone number associated with the local computer system 110. Preferably, the user device 130 automatically makes the connection and automatically dials the telephone number. However, those skilled in the art will recognize, after perusal of this application, that this step 312 may comprise any method of contacting the central computer system 100, including a cellular telephone connection, a radio telephone connection, or a local or wide-area computer network connection.

At a step 313, the user device 130 bundles together a unique identifier for itself (a "device ID"), a unique identifier for a user account for which it seeks authentication (an "account ID"), and a sequence number, into a sign-on message, encrypts that sign-on message with an encryption technique, and transmits the encrypted sign-on message to the central computer system 100. The encrypted sign-on message is further described with regard to FIG. 4.

The user device sends a set of identifying information to the remote processor. The. identifying information comprises a user device ID for the user device, a user ID for the user associated with the user device, and a sequence number for this access to the remote processor by the user device. During the step, the remote processor awaits the identifying information from the user device. The remote processor authenticates the identifying information from the user device. The unique ID for the user device is stored in the protected memory when the user device is manufactured or serviced. The protected memory comprises non-volatile memory (NOVRAM), so that this information is not lost when the user device is powered down. The encryption parameters for the user device are also stored in the protected memory when the user device is manufactured or serviced. Encryption parameters such as a password may also be altered by the user when the user device is properly authenticated. In a preferred embodiment, the user device and the remote processor use the encryption parameters to encrypt and decrypt messages on the communication path, so as to secure against reading or altering of those messages by an unauthorized party. Preferably, the encryption parameters specify a key or set of keys for encryption using the "DES" or "IVES" data encryption standards. The user ID for the user need not be stored in the protected memory, particularly if there is more than one user who is authorized to use the user device. The sequence number for the user device is stored in the protected memory. The user device may also store more than one sequence number, such as one for each remote processor.

In a preferred embodiment, the device ID comprises a unique identifier assigned to the device when it is manufactured.

In a preferred embodiment, the account ID comprises a unique identifier assigned to the user account when it is created. Each user account is associated with a user who is authorized to obtain services from the local computer system 110 using that account. Some user accounts may be associated with more than one user, such as a credit card which is associated with more than one member of a family. Each user account is generally associated with a billing statement, although in alternative embodiments some user accounts may be bundled together in a joint billing statement, such as a corporate credit card account.

In a preferred embodiment, the sequence number comprises a numeric value which is maintained synchronized between the central computer system 100 and the user device 130. The sequence number is stored in nonvolatile storage at the user device 130, so that the most recently used sequence number is available to the user device 130 when the method 300 is performed. Similarly, the sequence number is stored in nonvolatile storage or on a mass storage device at the central computer system 100, so that the most recently used sequence number is available to the central computer system 100 when the method 300 is performed.

In a preferred embodiment, the nonvolatile storage in which the sequence number is stored comprises a protected memory having the property that it self-erases if an attempt is made to read the protected memory in other than the ordinary course.

At a step 321, the local computer system 110 receives the sign-on message sent by the user device in the step 313, and requests the central computer system 100 to retrieve an account profile associated with the account ID which was transmitted. The account profile comprises information about the selected user account, and includes the sequence number associated with that user account.

In a preferred embodiment, more than one user device 130 may be associated with a single user account, but in that circumstance, each such user device 130 has its own profile. The sign-on message comprises a device ID for the user device 130 sending the message, so the central computer system 100 is able to determine which profile to retrieve if there are several profiles for a user account.

In a preferred embodiment, each profile comprises information shown in table 3-1:

Table 3-1 a device ID, the unique identifier for the user device;
a set of account IDs, each a unique identifier for a user account authorized for access using this user device;
a set of user IDs, each a unique identifier for a user authorized to use this user device;
the current sequence number, and an identifier for a method for updating the sequence number;
a set of profile encryption parameters, such as an encryption protocol (preferably the "DES" or "IVES" protocols) and a set of encryption keys; and
a set of selected profile options, such as a typical calling telephone number associated with this user account.

At a step 322, the local computer system 110 compares the sequence number transmitted with the sign-on message with the sequence number in the account profile. The step 322 is shown in further detail in FIG. 3B.

Those skilled in the art would recognize, after perusal of this application, that comparison of sequence numbers could be performed by the central computer system 100, by the local computer system 110, or by another computer system, so long as results of the comparison are used for authenticating the user device 130 and are reported to the user device 130 so that the user can determine if any unauthorized access has occurred.

In a first part of the step 322, the local computer system 110 compares the sequence number transmitted with the sign-on message with the sequence number in the account profile. If the two values are equal, the local computer system 110 follows the "EQUAL" path arrow to a first part of the step 326.

If the two values are unequal, the local computer system 110 proceeds with the second part of the step 322. In a second part of the step 322, the local computer system 110 determines if a sequence flag is set. The sequence flag indicates that one or more access attempts has been made with this particular user device 130, in which the handshake process for updating the sequence number failed. If the sequence flag is set, the central computer system 100 follows the "TRY_AGAIN" path arrow to the second part of the step 326.

In a preferred embodiment, the local computer system 100 checks the sequence flag only if the sequence number transmitted by the user device 130 is consistent with the presumption that the proper user is attempting access after a failed handshake. For example, if sequence numbers are updated in natural number order, i.e., one, two, three, ..., the local computer system 110 requires the sequence number to be something close, e.g., four or five, before checking the sequence flag. Other sequence numbers are presumed to indicate an attempt at unauthorized access.

Similarly, in a preferred embodiment, the local computer system 110 checks the sequence flag only a limited number of times, e.g., a maximum of three access attempts.

In a preferred embodiment, the user (or the user device 130) maintains an alternative telephone number to call for access, and/or a secondary authentication path (e.g., requiring a secondary password or authentication with a human operator), so as to provide the user an method for access in the event that the need for access is urgent.

If the two values are unequal and the sequence flag is not set, the local computer system 110 proceeds to the step 323.

At a step 323, the local computer system 110 obtains a set of "caller ID" information and records that information. Preferably, the caller ID information comprises information about the calling telephone number, where that information is available from the telephone network service provider. In a preferred embodiment, the local computer system 110 also records other information about the call, such as the time it occurred and the recipient telephone number.

At a step 324, the local computer system 110 informs relevant authorities (including the central computer system 100) that the user account has been subject to unauthorized access. In general, the unauthorized access is this particular call, as unauthorized persons are unlikely to have the correct sequence number for transmission to the local computer system 110 in the sign-on message. However, if an unauthorized person obtains the correct sequence number, the sequence number will be desynchronized between the system and the proper user device 130, and the next access attempt by the authorized user will produce a sequence number mismatch.

In a preferred embodiment, the step 324 is performed by send a telecopy message to a set of preselected destination telecopiers. For example, the preselected destination telecopiers could comprise a telecopier associated with a known authorized user.

At a step 325, the local computer system 110 denies access to the user device 130 and terminates the call.

At a step 314, the user device 130 begins the handshake procedure with the local computer system 110.

At a step 326, the local computer system 110 responds to the sign-on message from the user device 130. The step 326 is shown in further detail in FIG. 3B.

In a first part of the step 326, the user's sequence number and the system's sequence number are equal. The local computer system 110 sends an "EQUAL" message to the user device 130, and proceeds to the step 327. In response to the "EQUAL" message, the user device proceeds to the step 315.

In a second part of the step 326, the user's sequence number and the system's sequence number are unequal, but the sequence flag is set. The local computer system 110 sends a "TRY_AGAIN" message to the user device 130, and proceeds to the step 321. In response to the "TRY AGAIN" message, the user device proceeds to the step 320, where it updates the user's sequence number, and thereafter proceeds to the step 313.

At a step 315, the user device 130 updates its recorded sequence number.

In a preferred embodiment, the sequence number is selected from a pseudorandom sequence and the method for updating the sequence number is to select the next pseudorandom number in the pseudorandom sequence using a pseudorandom number generator. Pseudorandom number generators are described in D. Knuth, *The Art of Computer Programming* (vol. 2: Seminumerical Algorithms) (Addison-Wesley 1968).

However, those skilled in the art would recognize, after perusal of this application, that the method for updating the sequence number may comprise any one of a wide variety of techniques, such as (1) adding a constant to the sequence number, (2) multiplying the sequence number by a constant, or (3) some combination thereof.

In alternative embodiments, a plurality of sequence numbers may be associated with different message or tasks. For example, a first sequence number may be used for the sign-on message and a second sequence number may be used for other messages. In another example, a first sequence number may be used for messages with relatively higher security and a second sequence number may be used for messages with relatively lower security.

At a step 327, the system (both the central computer system 100 and the local computer system 110) updates its recorded sequence number for the indicated user account, and reseta the sequence flag.

At a step 316, the user device 130 determines if the handshake procedure completed properly. If not, the user device 130 proceeds with the step 317. If so, the user device 130 proceeds with the step 319.

At a step 317, the user device 130 restores the sequence number to the value it had before initiating the method 300.

At a step 318, the user device 130 terminates the call.

At a step 328, the local computer system 110 determines if the handshake procedure completed properly. If not, the local computer system 110 proceeds to the step 329. If so, the local computer system 110 proceeds to the step 331.

At a step 329, the system (both the central computer system 100 and the local computer system 110) increments the sequence flag.

At a step 330, the local computer system 110 terminates the call.

At a step 319, the user device 130 obtains services from the local computer system 110. In a preferred embodiment, the user device 130 processes a customer order placed by the user. After processing the order or obtaining other services, the user device 130 proceeds to the step 318 and terminates the call.

At a step 331, the local computer system 110 authenticates the user to an order processing subsystem, which processes the order or performs other services for the user. After processing the order or performing other services, the local computer system 110 terminates the call.

In a preferred embodiment, the user account comprises a first account in a plurality of user accounts for the same user, about which information is maintained at the central computer system 100. If any one of the user's user accounts is compromised by an unauthorized access, that unauthorized access will be detected by the local computer system 110 in response to a mismatch between the system's sequence number and the user's sequence number. The local computer system 110 so informs the central computer system 100. When the user accesses any other one of the user's user accounts using a (possibly different) local computer system 110, the central computer system 100 informs the local computer system 110 of the unauthorized access to the user's other user account, and the local computer system 110 so informs the user.

METHOD FOR ELECTRONIC SIGNATURE

Figure 4A:
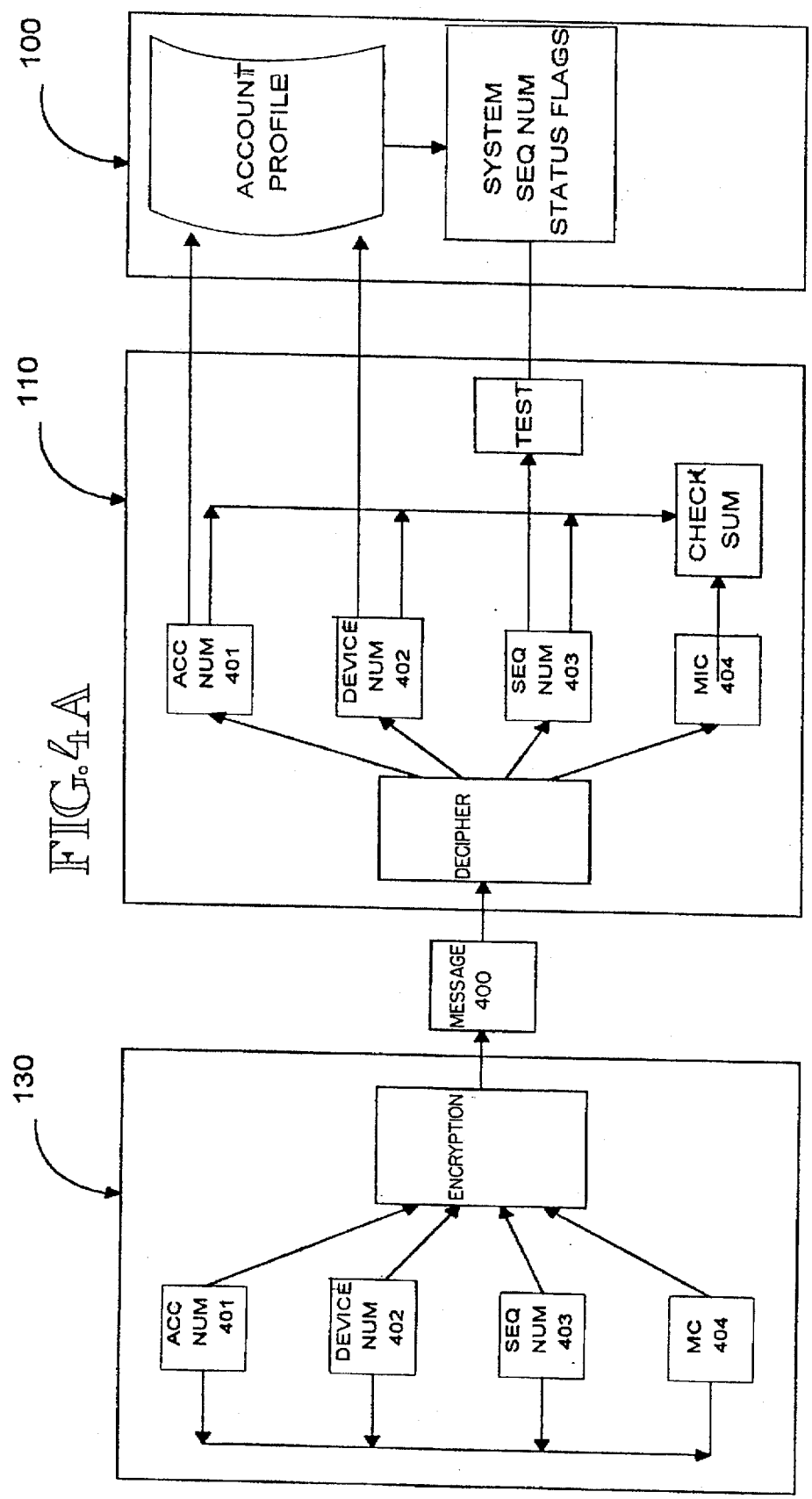
FIG. 4, comprising FIG. 4A, FIG. 4B, and FIG. 4C collectively, shows a data flow diagram of a method for electronic signature.

FIG. 4, comprising FIG. 4A, FIG. 4B, and figure 4C collectively, shows a data flow diagram of a method for electronic signature.

The user device 130 indicates to the central computer system 100 that an activity is authorized by the user by sending an encrypted message comprising identifying information for the user. The user device 130 bundles together a set of information into a message and encrypts that information for transmission to the central computer system 100.

The sign-on message 400 described with regard to FIG. 3 comprises an account ID number 401, a device ID number 402, a sequence number 403, and a media integrity code 404. The media integrity code 404 comprises a checksum or CRC code, to indicate whether any part of the message has been altered, damaged or garbled in transmission. The central computer system 100 or the local computer system 110 receives the sign-on message 400, decrypts it, checks the media integrity code 404, and identifies the separate individual items of information.

In a preferred embodiment, when the user desires to place an order for goods or services, the user device 130 sends an order-approval message 410 to the central computer system 100 The order-approval message 410 comprises an order number 411, the device ID number 402, the current sequence number 403, a user ID number 412, and the media integrity code 404. The central computer system 100 receives the order-approval message 410, decrypts it, checks the media integrity code 404, and identifies the separate individual items of information, in like manner as for the sign-on message 400. However, in a preferred embodiment the sequence number 403 is not updated for the order-approval message 410, only for the sign-on message 400. The central computer system 100 then transmits selected information to the local computer system 110.

In a preferred embodiment, when the user device 130 is about to send, to the central computer system 100 or the local computer system 110, data which is user sensitive, the user device 130 sends a sensitive-data message 420 to the central computer system 100 or to the local computer system 110. The sensitive-data message 420 comprises the device ID number 402, the current sequence number 403, the user ID number 412, and the media integrity code 404. The central computer system 100 receives the sensitive-data message 410, decrypts it, checks the media integrity code 404, and identifies the separate individual items of information, in like manner as for the sign-on message 400. However, in a preferred embodiment the sequence number 403 is not updated for the order-approval message 410, only for the sign-on message 400. The central computer system 100 then transmits selected information to the local computer system 110.

Alternative Embodiments

Although preferred embodiments are disclosed herein, many variations are possible which remain within the concept, scope, and spirit of the invention, and these variations would become clear to those skilled in the art after perusal of this application.

I claim:

1. A method for both authorizing access from a user device to an electronic account record stored at a computer authentication device, and for detecting attempted unauthorized access to said electronic account record, said method comprising the steps of:

recording at said computer authentication device an plurality of access sequence numbers and an account profile consisting essentially of an account identification number and a user device identification number and associating said recorded account profile with said electronic account record at said computer authentication device;

independently recording at said user device the same plurality of access sequence numbers and said account profile;

selecting at said authentication device from among said plurality of access sequence numbers a first access sequence number and associating said first access sequence number with said electronic account record;

independently selecting at said user device the same first access sequence number and associating said first access sequence number with said account profile at said user device;

transmitting a request for electronic access to said electronic account record from said user device to said computer authentication device, wherein said request comprises said first access sequence number and said account profile;

receiving said request at said computer authentication device and comparing said first access sequence number and said account profile received from said user device with said first access sequence number and account profile associated with said electronic account record;

determining at said computer authorization device that said received first access sequence number and said associated first access sequence number are the equal or unequal;

authorizing access to said electronic account record when said determination is equal;

whether or not said first access sequence numbers are equal or unequal, independently selecting from said plurality a second access sequence number at said user device and replacing said first access sequence number with said second access sequence number;

only if said first access sequence numbers are equal, independently selecting from said plurality a second access sequence number at said computer authentication device and replacing said first associated access sequence number with said second access sequence number;

wherein said method for detecting attempted unauthorized access comprises the step of determining that said first access sequence number or said account profile received from said user device and said first sequence number or account profile associated with said electronic account record are unequal and reporting the unequal finding to an account holder, a user, the computer authorization device or the user device.

2. The method of claim 1, further comprising the step of denying the user device electronic access at said authorization device when said step of determining that said first access sequence number or said account profile received from said user device and said first sequence number associated or account profile associated with said electronic account record are unequal and terminating the transmission from said user device.

3. The method of claim 1, wherein said step of reporting said unequal finding comprising sending a message to a pre-selected destination.

4. The method of claim 1, further comprising the steps of:

recording at said computer authentication device a user device identification number and associating said user device identification number with said electronic account record;

independently recording at said user device the same user device identification number;

wherein said step of transmitting a request for electronic access from said user device further comprises transmitting said user device identification number; and, wherein said step of authorizing electronic access to said electronic account record further comprises determining at said computer authorization device that said received user identification number and said recorded user identification number associated with the electronic account record are the same.

5. The method of claim 1, further comprising the steps of:

recording at said computer authentication device a user voice print and associating said user voice print with said electronic account record;

wherein said step of transmitting a request for electronic access from said user device further comprises transmitting a user voice message; and, wherein said step of authorizing electronic access to said electronic account record further comprises determining at said computer authorization device that said received user voice message and said recorded user voice print are substantially the same.

6. The method of claim 5, wherein said step of authorizing, electronic access to said electronic account record further comprises determining at said computer authorization device that said received user voice and said recorded user voice are substantially same comprises a determination made by a human operator.

7. The method of claim 1, further comprising the steps of:

recording at said computer authentication device a user PIN and associating said user PIN with said electronic account record;

wherein said step of transmitting a request for electronic access from said user device further comprises transmitting the user PIN; and, wherein said step of authorizing electronic access to said electronic account record further comprises determining at said computer authorization device that said received user PIN and said recorded user PIN are the same.

8. The method of claim 1, wherein said method for detecting unauthorized access further comprises the steps of:

recording at said authentication device and at said user device that said first access sequence number received from said user device and said first sequence number associated with said electronic account record were not the same.

9. The method of claim 1, wherein said plurality of access sequence numbers and said selected first access sequence number and said selected second access sequence number are stored in a protected memory at said user device.

10. The method of claim 1, wherein said account profile and said sign on message further comprises data selected from among a user identification number, a voice print, a user telephone number, a PIN or an encryption profile comprising an encryption protocol, a selected protocol option and an encryption key.

11. The method of claim 1, wherein after said independently selecting step at said user device and prior to said step of transmitting, said user device further performs the additional steps of:

encrypting said sequence number at said user device into an encrypted message;

transmitting said encrypted message to said authentication device; and the additional step at said computer authentication device performed after said receiving step of:

decrypting said encrypted message.

12. The method of claim 1, wherein after said determining step prior to said replacing of said first access sequence number the computer authentication device performs the additional step of computing a pseudorandom number to be used as said second sequence number in said replacing step.

13. The method of claim 1, wherein after said receiving step and before said determining step said method further comprises the steps of:

initiating a handshake process between said computer authentication device and said user device;

storing a second sequence number in a sequence flag location in said computer authentication device;

independently replacing said first sequence number with said second sequence number at said user device;

attempting to perform a step of completing said handshake process between said computer authentication device and said user device; and retrieving said sequence second sequence number from said sequence flag location if said attempt to perform said step of completing fails.

14. A method for detecting unauthorized access to an account at an authentication device, said method comprising the steps of:

recording a first sequence number and associating said sequence number with said account at the authentication device;

recording a second sequence number at a location in a user device;

transmitting a request from a user device to the authentication device, wherein said request comprises said second sequence number;

controlling access to said account in response to the request for access by determining whether said first sequence number and said second sequence number are the same or different and allowing access only if the first sequence number and the second sequence number are the same;

replacing said first sequence number with a third sequence number and associating said third sequence number with said account;

transmitting said third sequence number to said location in said user device; and replacing said second sequence number in said location in said user device with said third sequence number.

* * * * *

UNITED STATES PATENT AND TRADEMARK OFFICE
CERTIFICATE OF CORRECTION

PATENT NO. : 5,696,824
DATED      : December 9, 1997
INVENTOR(S) : J. Walsh

It is certified that error appears in the above-identified patent and that said Letters Patent is hereby corrected as shown below:

| COLUMN | LINE | |
|---|---|---|
| 4 | 1 | "08/485,261" should be --08/485,083-- |
| 4 | 4 | after "Wand", delete ", now U.S. Pat. No. 5,607,626" |
| 4 | 54 | delete comma after "if" and before "the" |
| 6 | 54 | "The." should be --The-- |
| 9 | 33, 34 | "TRY AGAIN" should be --TRY_AGAIN-- |
| 9 | 64 | "reseta" should be --resets-- |
| 10 | 65 | "100 The" should be --100. The-- |
| 12 | 66 | |
| (Claim 6 | (1.2) | "authorizing, electronic" should be --authorizing electronic-- |

Signed and Sealed this

Twelfth Day of May, 1998

Attest:

*Attesting Officer*

BRUCE LEHMAN

*Commissioner of Patents and Trademarks*